(12) United States Patent
Golshany et al.

(10) Patent No.: US 9,950,800 B2
(45) Date of Patent: Apr. 24, 2018

(54) INTEGRATED PUSHER TURBOFAN FOR AIRCRAFT

(71) Applicant: The Boeing Company, Chicago, IL (US)

(72) Inventors: Sina Golshany, Lynnwood, WA (US); Todd W. Erickson, Fife, WA (US); Christopher R. Holtorf, Marysville, WA (US); Derek R. Alderks, Seattle, WA (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 14/555,340

(22) Filed: Nov. 26, 2014

(65) Prior Publication Data

US 2016/0144967 A1 May 26, 2016

(51) Int. Cl.
| | |
|---|---|
| *B64D 27/18* | (2006.01) |
| *B64D 29/02* | (2006.01) |
| *B64C 3/32* | (2006.01) |
| *B64C 11/00* | (2006.01) |

(52) U.S. Cl.
CPC .............. *B64D 27/18* (2013.01); *B64C 3/32* (2013.01); *B64C 11/001* (2013.01); *B64D 29/02* (2013.01); *Y02T 50/66* (2013.01)

(58) Field of Classification Search
CPC ....... B64C 11/001; B64D 27/18; B64D 29/02; B64D 3/22; B64D 27/26
See application file for complete search history.

(56) References Cited

U.S. PATENT DOCUMENTS

| | | | | |
|---|---|---|---|---|
| 3,893,638 | A * | 7/1975 | Kelley | B64C 15/00 244/12.5 |
| 3,920,203 | A * | 11/1975 | Moorehead | B64C 21/04 244/110 B |
| 5,167,383 | A * | 12/1992 | Nozaki | B64D 27/18 244/12.5 |
| D479,501 | S * | 9/2003 | Nelson | D12/319 |
| 2008/0075580 | A1* | 3/2008 | Yanagi | B64D 27/18 415/119 |
| 2011/0167786 | A1* | 7/2011 | Marques | F02K 1/386 60/204 |
| 2015/0191245 | A1* | 7/2015 | Mores | B64C 27/06 244/17.19 |
| 2015/0284104 | A1* | 10/2015 | Zhao | B64D 33/02 244/53 B |
| 2015/0285144 | A1* | 10/2015 | Todorovic | F02C 7/045 137/15.1 |
| 2016/0076444 | A1* | 3/2016 | Bailey Noval | F02C 3/107 415/68 |
| 2016/0229527 | A1* | 8/2016 | Duke | B64C 23/065 |

\* cited by examiner

*Primary Examiner* — Valentina Xavier
(74) *Attorney, Agent, or Firm* — Felix L. Fischer

(57) ABSTRACT

A propulsion system for a transport aircraft employs a gas turbine core coupled to a wing. A ducted fan is coupled to the core gas turbine extending downstream from and integrated in a trailing edge of the airplane wing.

18 Claims, 7 Drawing Sheets

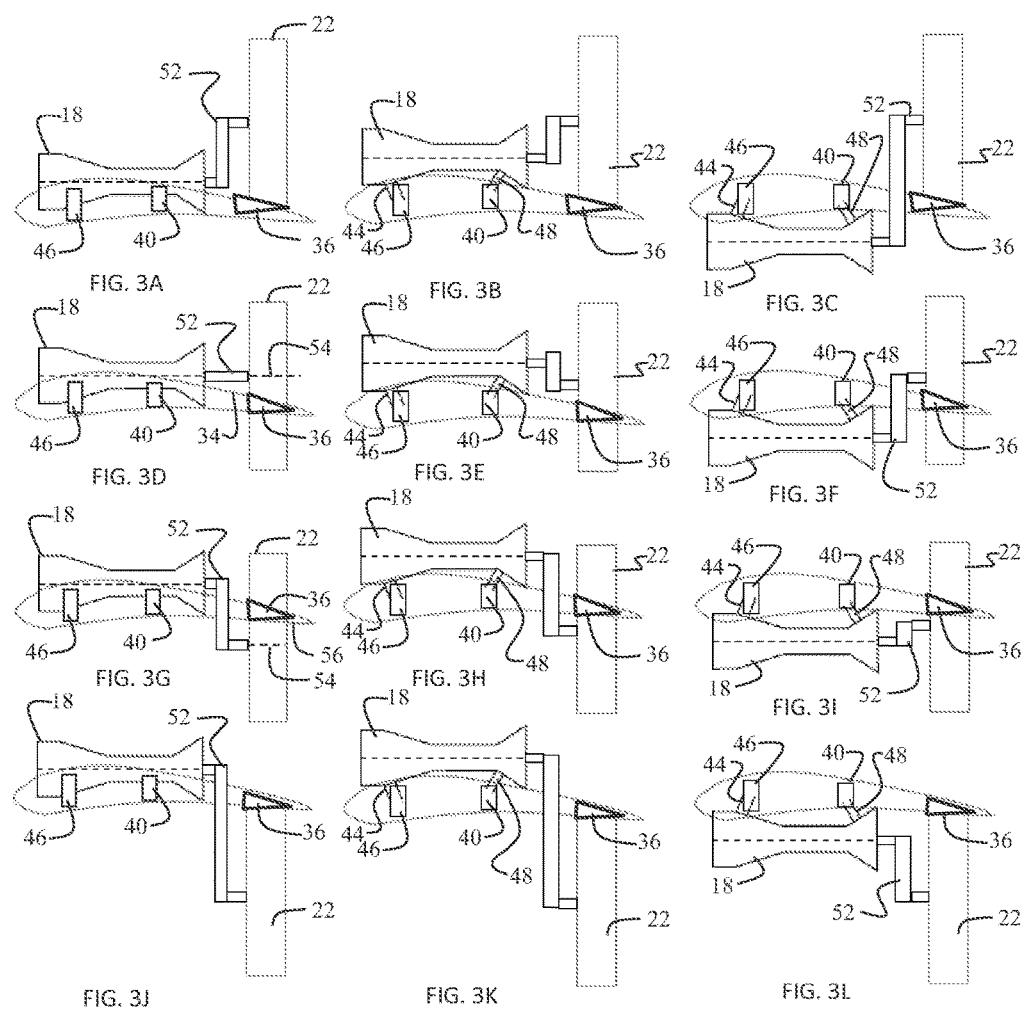

INTEGRATED PUSHER TURBOFAN FOR AIRCRAFT

REFERENCE TO RELATED APPLICATIONS

This application is copending with application Ser. No. 14/032,163 now U.S. Pat. No. 9,835,093 issued on Dec. 5, 2017 entitled Contra-rotating open fan propulsion system having a common assignee with the present application, the disclosure of which is incorporated herein by reference.

BACKGROUND INFORMATION

Field

Embodiments of the disclosure relate generally to power plants for transport aircraft and more particularly to a two stage pusher turbofan arrangement wherein the propulsor and associated shroud are mounted integrally aft of the trailing edge of the wing.

Background

High bypass ratio propulsor systems for large transport aircraft provide significant fuel efficiency and thrust increase over conventional turbojet power plants. Ducted fans enhance the qualities of high bypass aerodynamics by allowing aircraft operation at higher speeds and reduction of noise over unducted propulsors. Integration of ultra-high bypass ratio turbo-fan engines into a low-wing airplane with conventional landing gear in order to deliver reduced emissions and improved fuel efficiency, while avoiding the high noise traditionally associated with ultra-high bypass ratio unducted engines (often described as open-fan, open-rotor, or propfan engines) has not been accomplished.

It is therefore desirable to provide a structural design for integration of an ultra-high bypass ratio turbofan engine into a low-wing airplane.

SUMMARY

Exemplary embodiments provide a propulsion system for a transport aircraft employing a gas turbine core coupled to a wing. A ducted fan is coupled to the core gas turbine, extending downstream from and integrated in a trailing edge of the airplane wing.

A method of fabricating an airplane propulsion system is accomplished for the disclosed embodiments by coupling a ducted fan to a gas turbine core such that the ducted fan extends downstream from the gas turbine engine in a pusher configuration. A fairing is then employed for integration of the ducted fan into the wing structure.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

FIGS. 3A-3L are schematic side views of arrangements of the engine core in embedded, close coupled overwing and close coupled underwing mounting with overwing, mid shroud high, mid shroud low and underwing positioning of the fan duct;

DETAILED DESCRIPTION

The system and methods described herein provide embodiments for an ultra-high bypass ratio (cruise bypass ratio >15) turbofan engine, which has the core in front of the main propulsive fan in a pusher configuration to provide major improvements for aircraft emissions, performance and operating economics. The ratio of the mass-flow of air bypassing the engine core compared to the mass-flow of air passing through the core is referred to as the bypass ratio. Various embodiments demonstrate airplane level solutions to integrating such engines with a conventional airframe wherein the propulsor and the shroud (or duct) are mounted on the trailing edge of the wing. The core of the engine is mounted under or above the wing or is integral or embedded within the wing. The engine core can be made with any number of spools, with or without fixed or variable gearing in order to deliver power to the propulsive fan with both the propulsive fan and the core operating at proper rotational speeds. The engine core, while described herein as a gas turbine may alternatively be a direct or alternating current electrical motor, steam turbine or other prime mover. Additionally, the propulsor may be a two stage contra-rotating fan arrangement as depicted for the embodiments disclosed but may be a single stage fan as well.

Figure 1:
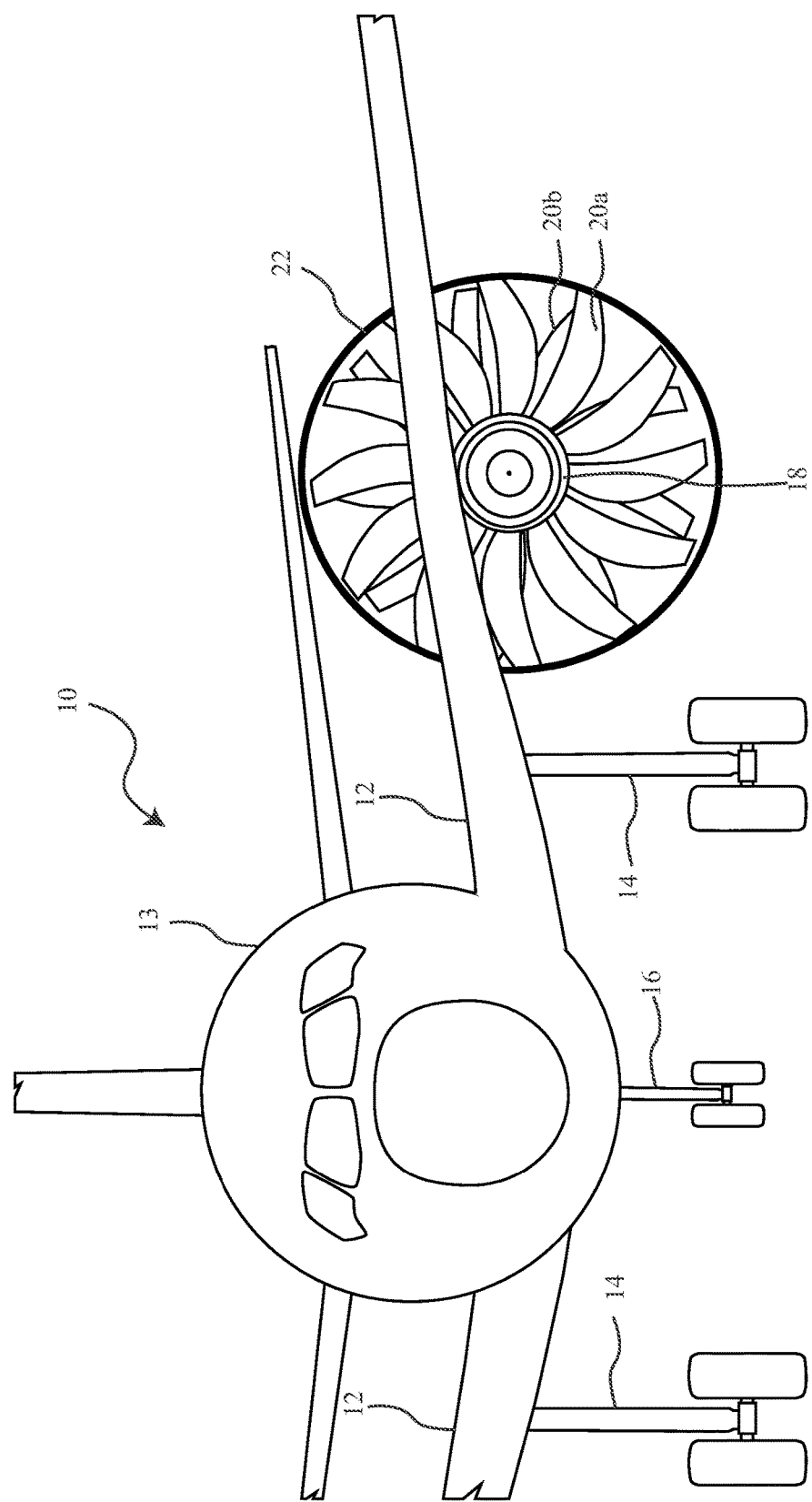
FIG. 1 is a partial view of an aircraft on which the present embodiments may be employed with a first exemplary arrangement

Referring to the drawings, FIG. 1 shows an aircraft 10, having a conventional configuration of low mounting of wings 12 with respect to fuselage 13 and having main landing gear 14 and nose gear 16 arranged in a conventional manner. An engine core 18 is mounted under wing 12 closely coupled for direct structural attachment to the wing spars as will be described in greater detail subsequently. The engine core 18 drives counter rotating fans or propulsors 20a and 20b. A shroud or duct 22 closely receives the propulsors 20a and 20b for enhanced aerodynamic performance of the propulsors and for noise reduction. Additionally, the shroud provides containment for released blades in the event of an engine failure. The thickness, structural design and fabrication for the shroud will incorporate containment requirements. The duct and propulsor arrangement may be, for example, the ducted fan coupled to the core gas turbine engine using a gear box as described in copending patent application Ser. No. 14/032,163 entitled Contra-rotating open fan propulsion system. The arrangement as shown for the port or left wing in FIG. 1 is duplicated on the starboard or right wing.

Figure 2A:
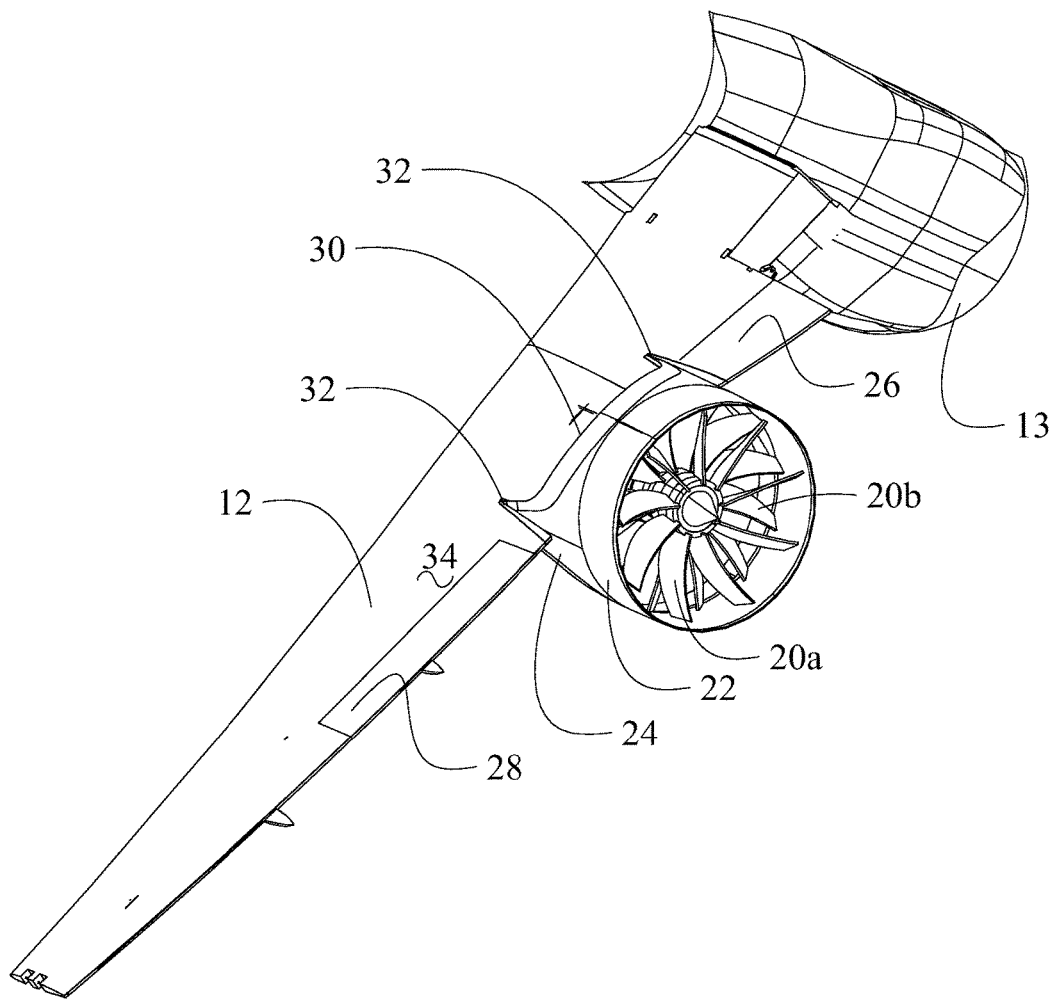
FIG. 2A is a partial top aft pictorial view of the embodiment of FIG. 1.

As seen in FIG. 2A, the duct 22 housing propulsors 20a and 20b employs a fairing 24 for aerodynamic and structural integration with the wing 12. The fairing 24 and duct 22 are located between moving surfaces on the wing such as inboard flap 26 and outboard or main flap 28. In alternative embodiments one or both of the moving surfaces may be aerodynamic control surfaces or may be primarily high-lift devices but with secondary function as primary control surfaces. For the embodiment shown, fairing 24 has a sculpted leading edge 30 with extending lateral points 32 integrating into the wing upper surface 34 and lower surface.

Figure 2B:
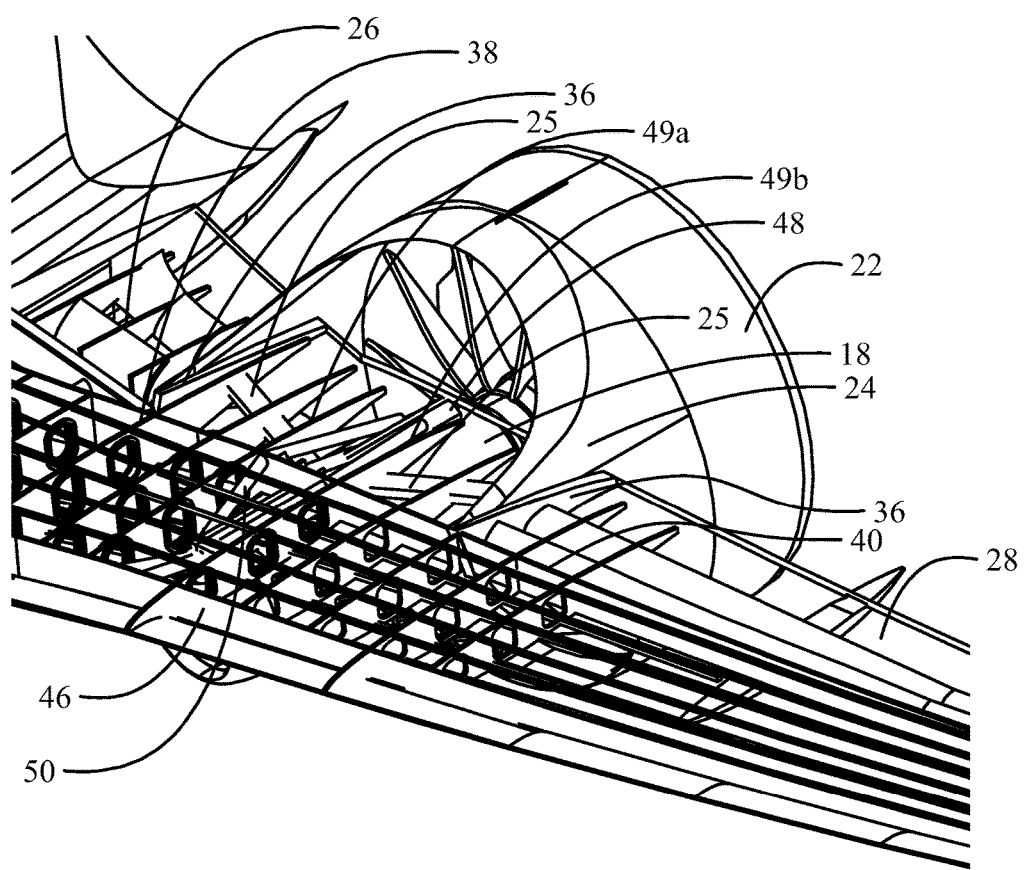
FIG. 2B is a partial top front pictorial view with wing skins removed showing details of the propulsor shroud or duct integration into the wing structure.
Figure 2C:
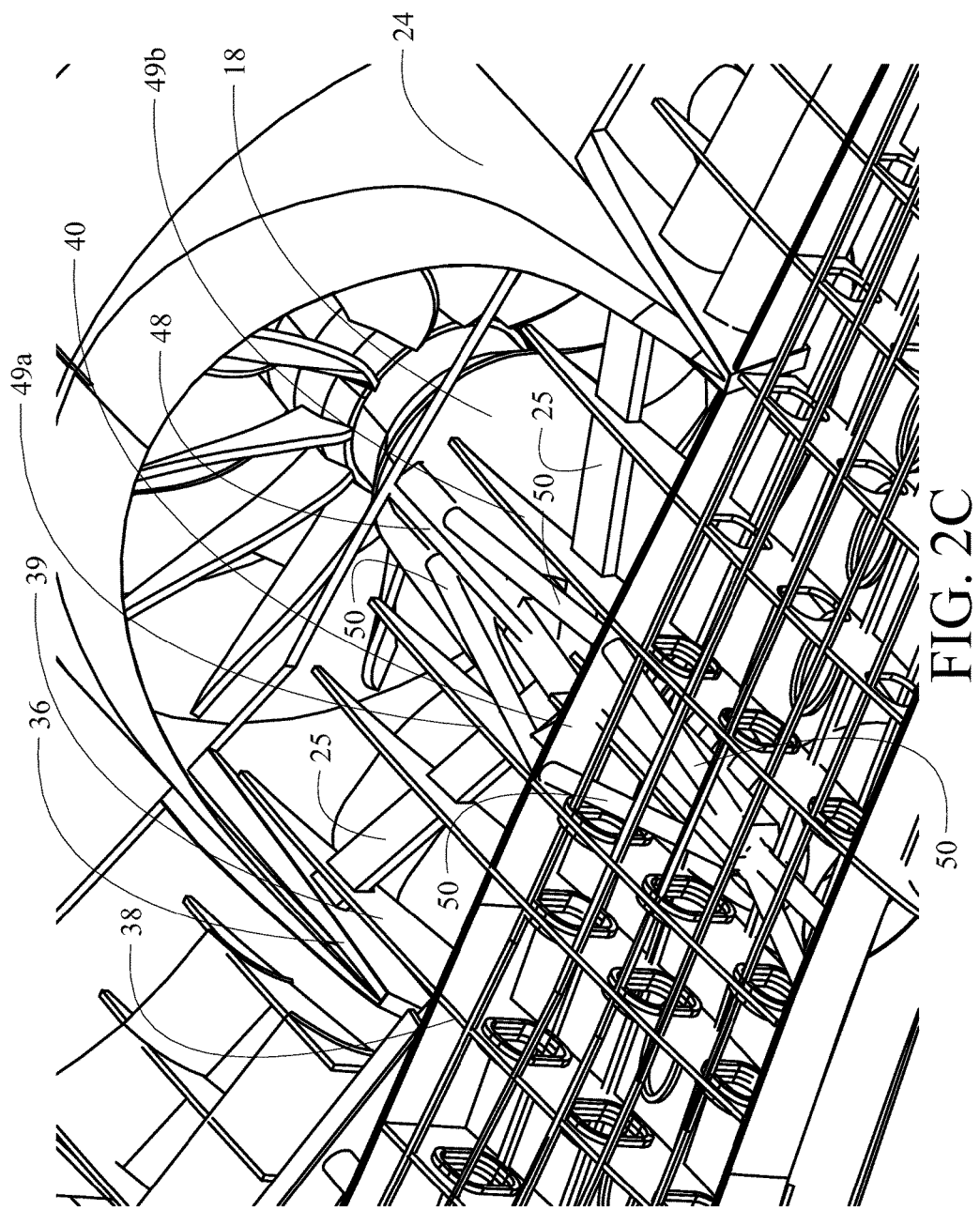
FIG. 2C is a detailed partial top front pictorial view with wing skins removed showing details of the propulsor shroud or duct integration into the wing structure.

As shown in FIG. 2B, the fairing 24 is interconnected into the wing structure with partial chord ribs 36 which may mate with the structural ribs 38 of the wing structure extending aft from the aft spar 40. The partial chord ribs 36 may be attached to the aft spar or structural ribs to support the duct 22 without direct support from the engine core. The attachments of the partial chord ribs 36 may be through pinned or resilient connections to allow flexing of the wing 12 without deforming of the fairing 24 and duct 22. In a desirable embodiment shown in FIG. 2B and shown in detail in FIG. 2C, the duct attachment structure provided by the fairing 24 is free to "float" inside the wing mold line. The fan duct 22 is attached through the fairing 24 to struts 25 that attach to a pylon 48 supporting the core 18 similar to known turbofan engines but much shorter. The fairing 24 is supported by struts 25 engaging the partial cord ribs 36 only with clearance apertures through any intervening ribs. A deformable membrane 39 made of synthetic material seals the gap between the partial cord rib 36 and the wing interior to reduce aerodynamic drag. This allows wing deformations (due to aerodynamic or inertial loads acting on the wing) to be decoupled from the any deformation of the duct 22. Additionally, decoupling the shroud from the wing isolates structural damage in event of a blade loss. If the propulsor sheds a blade, the fan duct 22 deforms to absorb the energy and contain the blade, to preclude the blade from penetrating the fuselage or the wing. If the fairing 24 is tightly coupled with the wing structure, the deformation of the duct 22 in the event of a blade loss might be transmitted to the wing box via the aft spar 40 resulting in potential structural damage. In the desired embodiment, the strut 25 transfers such loads to the pylon 48 which is attached securely to the wing structure and surrounded by a "dry-bay" to prevent any potential for the wing fuel tanks to rupture. The dry bay is the volume constrained by the two ribs 49a and 49b on either side of the pylon 48.

Alternatively or in addition, the structural rigidity of the fairing 24 may be predetermined comparative to the structural rigidity of the duct 22 to absorb or mitigate flexing allowing the duct to remain circular and undistorted. The core 18 may be integrated into the wing with the short pylon 48 using thrust links 50 at the front and aft spars 40, 46.

As shown in FIGS. 3A-3L, the gas turbine core 18 may be mounted externally to the wing 12 via a pair of pylons 44 and 48 connected to the front spar 46 and aft spar 40 or, alternatively, the core 18 may be coupled directly to the wing spars 46 and 40, such that a portion of the core is at least partially within the airplane wing as shown in FIGS. 3A, 3D, 3G and 3J. The pylon connection may be accomplished with the core 18 in an overwing position as shown in FIGS. 3B, 3E, 3H and 3K or with the core 18 in an underwing position as shown in FIGS. 3C, 3F, 3I and 3L. The configuration of FIG. 3I is substantially as disclosed for the detailed embodiment described in FIGS. 2A and 2B.

As previously described, the propulsor may be interconnected to the core 18 with a gear box 52. The gear box 52 may incorporate vertical and/or lateral displacement of the propulsor and duct 22 from an axis 54 of the core 18 using flexible joints and shafts.

A first general configuration of the propulsor duct 22 is shown in FIGS. 3A-3C wherein the duct is substantially located over the wing upper surface 34 with the partial chord ribs 36 located in a bottom portion of the duct 22. For the wing embedded mounting of the core 18 as shown in FIG. 3A, the gear box 52 provides an upward vertical offset for the propulsor. For the overwing mounting of the core 18 as shown in FIG. 3B, the gear box also provides a modest upward vertical offset. In various alternative configurations, the diameter of the propulsor and duct 22 or the length of the pylons 44, 48 may be adjusted to allow axial alignment of the core 18 and propulsor and duct. For the underwing mounting of the core as shown in FIG. 3C, the gear box 52 provides a large upward vertical offset.

A second general configuration of the propulsor duct 22 is shown in FIGS. 3D-3F wherein the duct is located with a midline 54 above but proximate to the wing top surface 34. For the wing embedded mounting of the core 18 as shown in FIG. 3D, the gear box 52 and core 18 are substantially aligned with the propulsor. For the overwing mounting of the core 18 as shown in FIG. 3E, the gear box provides a modest downward vertical offset. In various alternative configurations, the diameter of the propulsor and duct 22 or the length of the pylons 44, 48 may be adjusted to allow axial alignment of the core 18 and propulsor and duct. For the underwing mounting of the core as shown in FIG. 3F, the gear box 52 provides a modest upward vertical offset.

A third general configuration of the propulsor duct 22 is shown in FIGS. 3G-3I wherein the duct is located with the midline 54 below but proximate to the wing lower surface 56. For the wing embedded mounting of the core 18 as shown in FIG. 3G, the gear box provides a modest downward vertical offset for the propulsor. For the overwing mounting of the core 18 as shown in FIG. 3H, the gear box provides a large downward vertical offset. For the underwing mounting of the core as shown in FIG. 3I, the gear box 52 provides a small upward vertical offset. In various alternative configurations, the diameter of the propulsor and duct 22 or the length of the pylons 44, 48 may be adjusted to allow axial alignment of the core 18 and propulsor and duct.

A final configuration of the propulsor duct 22 is shown in FIGS. 3J-3L wherein the duct is substantially located under the wing lower surface 54 substantially even with or aft of the trailing edge with the partial chord ribs 36 located in an upper portion of the duct 22. This configuration would be applicable primarily to high wing mounting. For the wing embedded mounting of the core 18 as shown in FIG. 3J, the gear box provides a large downward vertical offset for the propulsor. For the overwing mounting of the core 18 as shown in FIG. 3K, the gear box provides a very large downward vertical offset. For the underwing mounting of the core as shown in FIG. 3I, the gear box 52 provides a modest downward vertical offset.

Due to the operation of the propulsor behind the wing trailing edge the propulsor may be slightly less efficient in generating thrust due to the ingestion of the low-energy wing boundary layer and wake behind the trailing edge. Additionally, in some of the embodiments illustrated in FIGS. 3A-3I, there may be an increase in fan noise due to ingestion of the wake by the propulsor. In exemplary embodiments, increase in fan noise may be partially or wholly mitigated by ejecting air to fill the wake (or the air velocity deficit) behind the trailing edge of the wing adjacent to the propulsor as shown schematically in FIG. 4A.

Figure 4A:
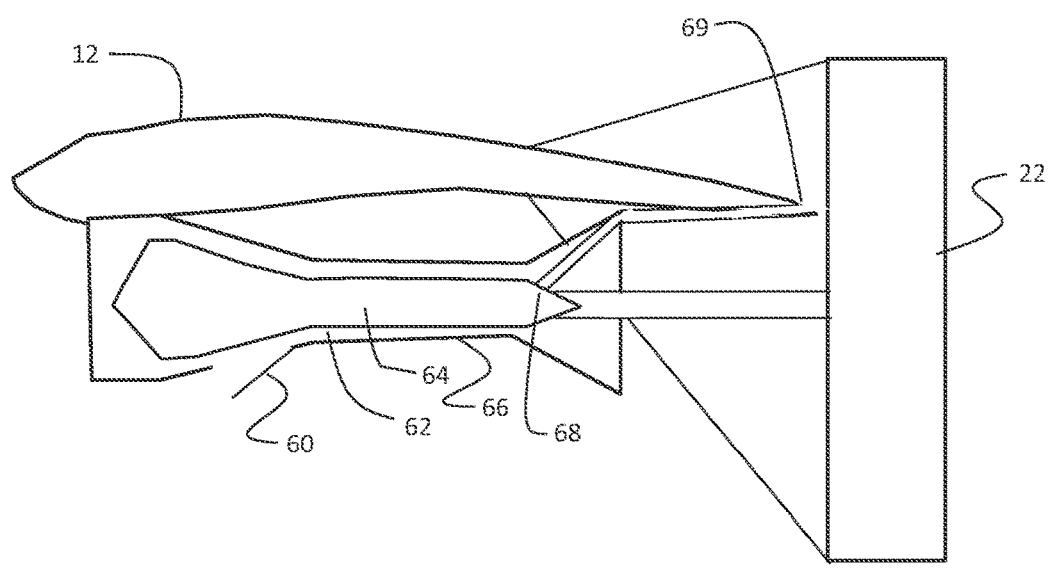
FIG. 4A is a schematic representation of a supplemental injection system for energizing the boundary layer adjacent the fan duct.

As shown in FIG. 4A engine core ventilation air may be employed to energize the boundary layer. For thermal and safety reasons, the engine core nacelle is typically vented using air either from the early stages of the engine core, or with scoops 60 using outside air. The source air circulates in the volume 62 between the engine core 64 and the core nacelle 66 and is typically combined with and ejected via the core nozzle 68. This flow can then be ejected proximate the wing trailing edge 69 to fill the wake behind the wing trailing edge facing the propulsor duct 22.

Figure 4B:
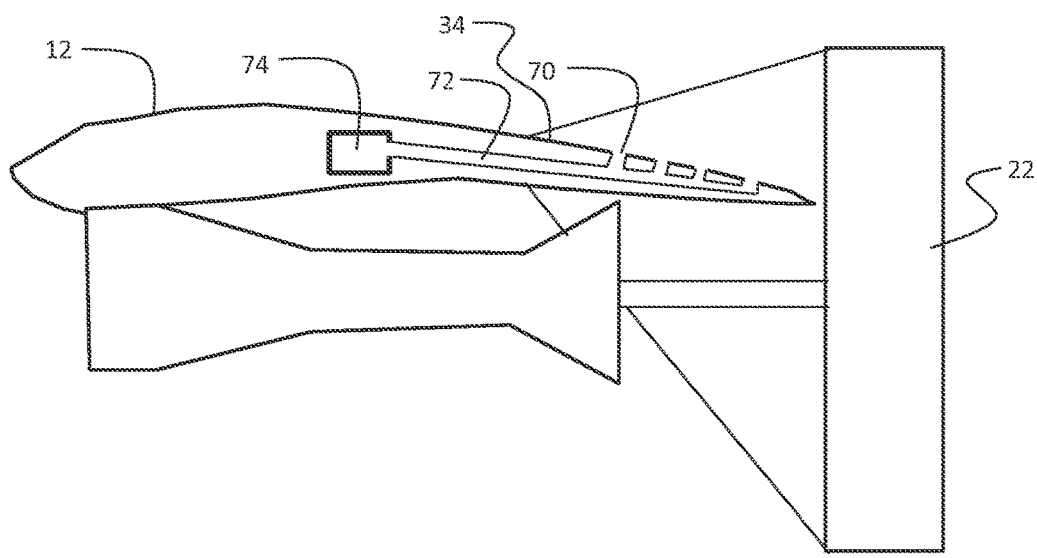
FIG. 4B is a schematic representation of a boundary layer removal system to extract the boundary layer adjacent the fan duct; and, FIG. 5 is a flow chart of a method for implementing the disclosed embodiments.

An alternative embodiment is shown in FIG. 4B the wing trailing edge wake and boundary layer are substantially removed, before being ingested into the propulsor duct 22, via perforations 70 in the wing upper surface 34 and a suction chamber 72. A vacuum system 74 attached to the suction chamber 72 provides pressure differential to draw the boundary layer into the suction chamber and then discharge the flow overboard at a location not interfering with the propulsor.

Figure 5:
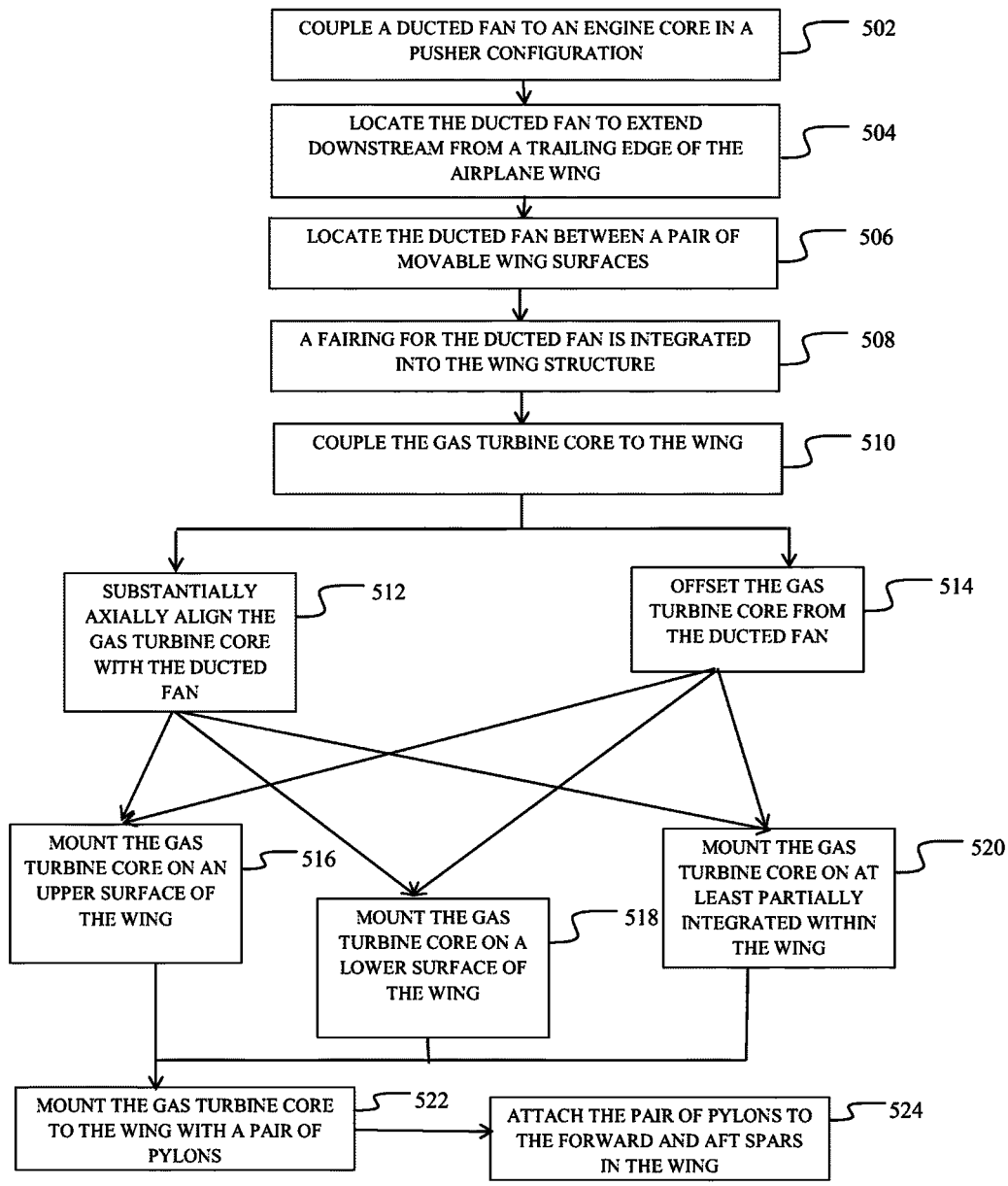

A method of fabricating an airplane propulsion system is provided by the disclosed embodiments as shown in FIG. 5. A ducted fan having a bypass ratio of greater than 15 is coupled to a gas turbine core with a gear box such that the ducted fan extends downstream from the gas turbine engine in a pusher configuration, step 502. The ducted fan located to extend downstream from a trailing edge of the airplane wing, step 504, and the ducted fan is located between a pair of movable wing surfaces, step 506. A fairing for the ducted fan is integrated into the wing structure, step 508 and the gas turbine core is coupled to the wing, step 510. The gas turbine core is substantially axially aligned with the ducted fan, step 512, or the gas turbine core is offset from the ducted fan, step 514. The gas turbine core may be mounted on an upper surface of the wing, step 516, a lower surface of the wing, step 518, or at least partially integrated within the wing, step 520. The mounting the gas turbine core to the wing may be accomplished with a pair of pylons, step 522, and the pair of pylons may be attached to the forward and aft spars in the wing, step 524.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A propulsion system for a transport aircraft comprising:
   an engine core coupled to an airplane wing; and,
   a ducted fan coupled to the engine core and extending downstream from the wing, said ducted fan located between a pair of movable wing surfaces, and having a fairing integrated with structural support in a trailing edge of the airplane wing.

2. The propulsion system as defined in claim 1 wherein the ducted fan has a bypass ratio greater than 15.

3. The propulsion system as defined in claim 1 further comprising a gearbox coupling the ducted fan to the engine core.

4. The propulsion system as defined in claim 1 wherein the engine core is substantially axially aligned with the ducted fan.

5. The propulsion system as defined in claim 1 wherein the engine core is offset from the ducted fan.

6. The propulsion system as defined in claim 1 wherein the engine core is mounted on a lower surface of the wing.

7. A propulsion system for a transport aircraft comprising:
   an engine core coupled to an airplane wing; and,
   a ducted fan coupled to the engine core and extending downstream from the wing and having a fairing integrated with structural support in a trailing edge of the airplane wing, wherein the engine core is at least partially integrated within the wing.

8. The propulsion system as defined in claim 1 further comprising a supplemental injection system for energizing the boundary layer adjacent the fan duct.

9. The propulsion system as defined in claim 1 further comprising a boundary layer removal system to extract the boundary layer adjacent the fan duct.

10. A method of fabricating an airplane propulsion system comprising:
    coupling a ducted fan to an engine core such that the ducted fan extends downstream from the engine core in a pusher configuration;
    locating the ducted fan between a pair of movable wing surfaces on an airplane wing to extend downstream from the airplane wing; and,
    integrating a fairing for a duct of the ducted fan into a trailing edge structure of the airplane wing.

11. The method as defined in claim 10 further comprising: coupling the engine core to the wing.

12. The method as defined in claim 11 wherein the ducted fan has a bypass ratio greater than 15.

13. The method as defined in claim 11 further comprising coupling the ducted fan with a gearbox to the engine core.

14. The method as defined in claim 11 wherein the engine core is substantially axially aligned with the ducted fan.

15. The method as defined in claim 11 wherein the engine core is offset from the ducted fan.

16. The method as defined in claim 11 further comprising mounting the engine core at least partially integrated within the wing.

17. The method as defined in claim 11 further comprising mounting the engine core to the wing with a pair of pylons.

18. The method as defined in claim 11 further comprising attaching the pair of pylons to the forward and aft spars in the wing.

* * * * *